Aug. 29, 1944.   R. W. THORNE   2,356,800
HOIST
Filed June 15, 1942
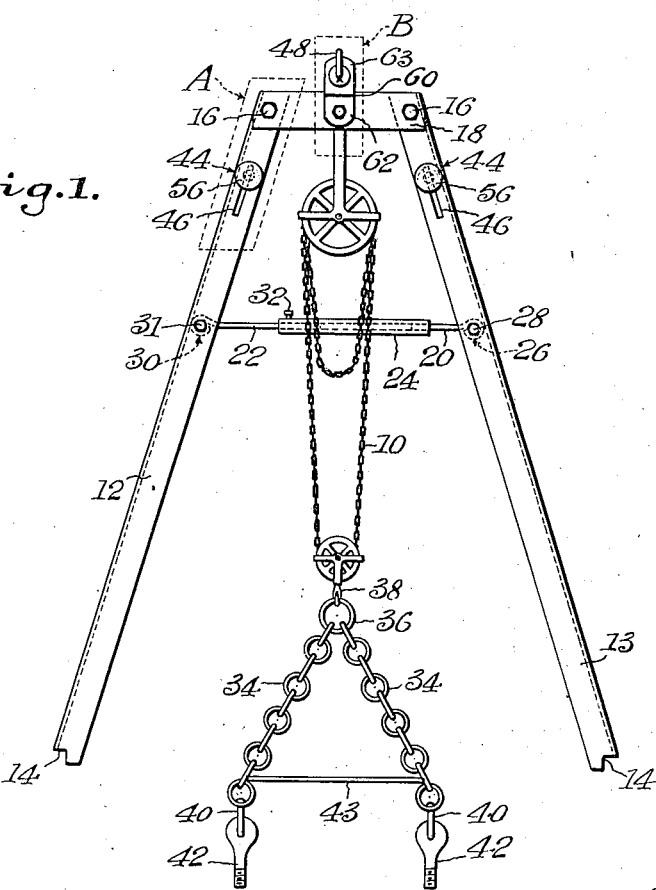
INVENTOR
ROBERT W. THORNE
BY
ATTORNEYS Patented Aug. 29, 1944

2,356,800

UNITED STATES PATENT OFFICE 2,356,800

HOIST

Robert W. Thorne, United States Army
Schofield Barracks, Territory of Hawaii

Application June 15, 1942, Serial No. 447,018

3 Claims. (Cl. 254—139)

(Granted under the act of March 3, 1883, as
amended April 30, 1928; 370 O. G. 757)

The invention described herein may be manufactured and used by or for the Government for governmental purposes, without payment to me of any royalty thereon.

This invention relates to hoisting mechanism, and particularly to an improved construction especially adapted for use as an automobile transmission hoist.

It is an object of my invention to provide a hoist which may be efficiently positioned and operated by one man.

Another object of my invention is to provide a hoist which is light in weight and arranged so that the chassis of the automobile acts as a base for the hoist.

Still another object of my invention is to provide a hoist which is of simple construction, may be made from standard materials which are readily available, and will be inexpensive to build and maintain.

These and other objects of my invention will become apparent upon a consideration of the following detailed description when taken in conjunction with the accompanying drawing in which:

Fig. 1 is a front elevation of an embodiment of the invention;

Fig. 2 is a perspective view, partially cut away, of the portion of the hoist contained in the dotted lines A of Fig. 1; and Fig. 3 is a side elevation of the portion of the hoist contained in the dotted lines B of Fig. 1.

Referring to Fig. 1, it will be seen that my hoist consists of an A frame from which is supported the hoisting tackle 10. The lifting mechanism is here shown as a chain hoist, the operation of which is well known to those skilled in the art. The legs 12 and 13 of the frame consist of angle iron members and have their lower ends cut away to form the shelf 14. Frame bolts 16 hold the top plates 18 and 19, only one of which may be seen, in position and also to act as bearings by means of which the separation of the legs 12 and 13 may be adjusted to any desired width.

In order to maintain the legs 12 at the desired width there is provided an extension rod consisting of two tie rods 20 and 22 and the extension sleeve 24. The tie rod 20 is welded to the extension sleeve 24 and is provided with an eye 26 whereby it may be fastened to the leg 13 by means of bolt 28. The tie rod 22 is arranged to slide within the extension sleeve 24 and is provided with an eye 30 whereby it may be fastened to the leg 12 by means of bolt 31. The extension sleeve 24 is provided with a set screw 32 by means of which the extension rod may be held in any desired position.

For attachment to the transmission there is provided an arrangement consisting of a chain 34 with a ring 36 in its center. The ring 36 affords a means whereby the chain may be placed over the hook 38 of the lifting mechanism 10. The ends of the chain 34 are provided with swivel links 40 which in turn carry eye bolts 42. The eye bolts 42 are of a proper size to be screwed into the transmission and the swivel links 40 provide a means whereby, when the eye bolts 42 are being inserted, the chain 34 will not become twisted. A spreader 43 is provided to space the chain and relieve the strain on the eye bolts 42 while the transmission is supported by the hoist.

Cushion blocks 44 are provided to prevent marring of the surface upon which the frame is rested and are adjustable within the range of the slots 46 placed in the webs of the legs 12 and 13.

A spring hook 48 is provided so that the frame may be held in position and obviate any danger of the apparatus falling out of position while being adjusted.

The construction of the corner joint and the cushion block will be clear from a consideration of Fig. 2. A section of angle iron 50 of a length equal to the width of the top plates 18 and 19 is welded to the top of each of the legs 12 and 13 so as to form a square conduit. The front top plate 18 is bolted to the face of the legs 12 and 13 and the rear top plate 19 is bolted to the face of the angle irons 50. The cushion block 44 consists of a cylindrical member of wood 52 through which the carriage bolt 54 passes. The member 52 is provided with a semispherical head 56 of rubber. The blocks 44 are attached to the frame by means of wing nuts 58.

The construction of the spring hook assembly will be clear from a consideration of Fig. 3. An extension plate 60 is provided with oppositely extended ends 62 and 63. The end 62 is bolted to the center of the top plate 18. The end 63 is provided with a hole through which the shank of the spring hook 48 passes. The spring is held in place by means of the washer 66 and the nut 68 threaded to the free end of the hook 48. The rearward movement of the hook is limited by means of the cotter pin 70.

In operation, the floorboards are removed from the vehicle from which the transmission is to be removed. The set screw 32 is loosened and the frame placed in position with the shelves 14 resting upon the chassis. The set screw 32 is then tightened and the cushion blocks 44 adjusted by positioning them in their respective slots 46 so that they will rest upon the dashboard when the frame is tilted forward to a slightly inclined position. The spring hook 48 is hooked onto any convenient projection such as the windshield frame or the ventilating cowl. If no suitable projection is present, a small block having an eye bolt inserted therein may be fixed in position and the hook 48 engaged therewith. Since the hook is used merely to prevent accidental upsetting of the hoist, and since it carries no part of the load strain, the object to which it is secured need not be substantial. The chain 34 is hung, by means of the ring 36 from the lifting mechanism 10 and the eye bolts 42 screwed into the center of the transmission. The spreader 43 is then placed in position and the hoist manipulated so as to place the transmission in position to be worked upon. The reverse procedure is followed in replacing the transmission.

Having described my invention, what I claim as new and wish to secure by Letters Patent is:

1. A portable hoisting apparatus for automobile transmissions adapted to be mounted upon the side rails of an automobile assembly with its upper portion leaning against the dashboard of such assembly, said hoisting apparatus comprising, in combination, a cross head, a pair of legs inclined toward each other and pivotally connected at their upper ends to the extremities of said cross head, the free ends of said legs being provided with means for slidably engaging said side rails, an expansible spreader interconnecting said legs intermediate their extremities and adjustable to regulate the span of said legs, buffer members attached to said legs adjacent their upper ends for engagement with said dashboard, a hoisting mechanism suspended from said cross head, and anchoring means carried by said cross head and arranged in a plane normal thereto, said anchoring means including a yieldable member for engagement with a suitable part of said automobile assembly.

2. A portable hoisting apparatus for automobile transmissions adapted to be mounted upon the side rails of an automobile assembly with its upper portion leaning against the dashboard of such assembly, said hoisting apparatus comprising, in combination, a cross head, a pair of legs inclined toward each other and pivotally connected at their upper ends to the extremities of said cross head, the free ends of said legs being provided with means for slidably engaging said side rails, an expansible spreader interconnecting said legs intermediate their extremities and adjustable to regulate the span of said legs, buffer members attached to said legs adjacent their upper ends, said members being adjustable lengthwise of the legs for engagement with said dashboard, a hoisting mechanism suspended from said cross head, and anchoring means carried by and extending normal to said cross head, said anchoring means including a yieldable element for engagement with a suitable part of said automobile assembly.

3. A portable hoisting apparatus for automobile transmissions adapted to be mounted upon the side rails of an automobile assembly with its upper portion leaning against the dashboard of such assembly, said hoisting apparatus comprising, in combination, a cross head, a pair of legs inclined toward each other and pivotally connected at their upper ends to the extremities of said cross head, the free ends of said legs being provided with means for slidably engaging said side rails, an expansible spreader interconnecting said legs intermediate their extremities and adjustable to regulate the span of said legs, buffer members attached to said legs adjacent their upper ends, said members being adjustable lengthwise of the legs for engagement with said dashboard, a hoisting mechanism suspended from said cross head and including a block and tackle assembly, a flexible grappling element connected to the tackle of said assembly, and anchoring means carried by said cross head and extending in a plane normal thereto, said anchoring means including a yieldable member for engagement with a suitable part of said automobile assembly.

ROBERT W. THORNE.